US012033285B2

(12) United States Patent
Chen et al.

(10) Patent No.: US 12,033,285 B2
(45) Date of Patent: Jul. 9, 2024

(54) OBJECT IDENTIFICATION DEVICE AND OBJECT IDENTIFICATION METHOD

(71) Applicant: Wistron Corp., New Taipei (TW)

(72) Inventors: Wei-Chou Chen, New Taipei (TW); Ming-Fong Yeh, New Taipei (TW); Yu-Chi Chang, New Taipei (TW); Lee-Chun Ko, New Taipei (TW)

(73) Assignee: Wistron Corp., New Taipei (TW)

( * ) Notice: Subject to any disclaimer, the term of this patent is extended or adjusted under 35 U.S.C. 154(b) by 66 days.

(21) Appl. No.: 17/944,128

(22) Filed: Sep. 13, 2022

(65) Prior Publication Data

US 2023/0290077 A1 Sep. 14, 2023

(30) Foreign Application Priority Data

Mar. 11, 2022 (TW) .................................. 111108947

(51) Int. Cl.
*G06T 19/00* (2011.01)
*G02B 27/01* (2006.01)
*G06F 3/01* (2006.01)
*G06F 3/0346* (2013.01)
*G06T 7/50* (2017.01)
*G06T 19/20* (2011.01)

(52) U.S. Cl.
CPC ........ *G06T 19/006* (2013.01); *G02B 27/0172* (2013.01); *G06F 3/011* (2013.01); *G06F 3/0346* (2013.01); *G06T 7/50* (2017.01); *G06T 19/20* (2013.01); *G02B 2027/0138* (2013.01); *G02B 2027/014* (2013.01); *G02B 2027/0178* (2013.01); *G06T 2219/2016* (2013.01)

(58) Field of Classification Search
CPC ......... G06T 19/006; G06T 7/50; G06T 19/20; G06T 2219/2016; G02B 27/0172; G02B 2027/0138; G02B 2027/014; G02B 2027/0178; G06F 3/011; G06F 3/0346; G06F 3/013; G09G 5/00
See application file for complete search history.

(56) References Cited

U.S. PATENT DOCUMENTS 11,049,277 B1 * 6/2021 Price ...................... G06F 3/012
11,212,503 B1 * 12/2021 Bleyer ................ H04N 13/111
(Continued)

FOREIGN PATENT DOCUMENTS

CN 108604118 A 9/2018
CN 111815755 A 10/2020
(Continued)

*Primary Examiner* — Sarah Lhymn

(57) ABSTRACT

A virtual window configuration method includes the following steps. A processor generates a virtual window. A depth detection sensor generates depth information based on an image. The processor analyzes the depth information to generate a depth matrix. The processor finds a depth configuration block in the image using the depth matrix. A feature point detection sensor generates feature point information for the image. The processor analyzes the feature point information to generate a feature point matrix. The processor finds a feature point configuration block in the image using the feature point matrix. The processor moves the virtual window to the depth configuration block or the feature point configuration block.

16 Claims, 15 Drawing Sheets

(56) References Cited

U.S. PATENT DOCUMENTS

| | | | | |
|---|---|---|---|---|
| 2003/0095711 A1* | 5/2003 | McGuinness | ............ | G06T 7/33 |
| | | | | 382/209 |
| 2015/0235447 A1* | 8/2015 | Abovitz | ............ | G02B 27/4205 |
| | | | | 345/633 |
| 2016/0088285 A1* | 3/2016 | Sadi | ............ | G03B 35/08 |
| | | | | 348/43 |
| 2018/0017800 A1* | 1/2018 | Horii | ............ | G02B 27/14 |
| 2018/0045963 A1* | 2/2018 | Hoover | ............ | G02B 27/017 |
| 2019/0094981 A1* | 3/2019 | Bradski | ............ | H04N 21/414 |
| 2019/0362557 A1* | 11/2019 | Lacey | ............ | G06T 5/20 |
| 2020/0111255 A1* | 4/2020 | Brodsky | ............ | G06F 3/011 |
| 2020/0151383 A1* | 5/2020 | Sirota | ............ | G06F 40/14 |
| 2021/0279950 A1* | 9/2021 | Phalak | ............ | G06T 7/55 |
| 2021/0364900 A1* | 11/2021 | Hsien | ............ | G03B 21/2066 |
| 2022/0084279 A1* | 3/2022 | Lindmeier | ............ | G06F 3/017 |
| 2022/0174261 A1* | 6/2022 | Hornstein | ............ | G06N 20/00 |
| 2023/0092282 A1* | 3/2023 | Boesel | ............ | G06F 3/04845 |
| | | | | 715/849 |
| 2023/0316634 A1* | 10/2023 | Chiu | ............ | G06F 3/011 |
| | | | | 345/156 |
| 2023/0334808 A1* | 10/2023 | Sundstrom | ............ | G06T 19/20 |

FOREIGN PATENT DOCUMENTS

| | | | | | |
|---|---|---|---|---|---|
| CN | 113065546 A | * | 7/2021 | ............ | G06K 9/3233 |
| JP | 2000041173 A | * | 2/2000 | | |

* cited by examiner

OBJECT IDENTIFICATION DEVICE AND OBJECT IDENTIFICATION METHOD

CROSS REFERENCE TO RELATED APPLICATIONS

This application claims priority of Taiwan Patent Application No. 111108947, filed on Mar. 11, 2022, the entirety of which is incorporated by reference herein.

BACKGROUND OF THE INVENTION

Field of the Invention

The present disclosure relates to a window configuration device, and in particular, it relates to a virtual window configuration device, a virtual window configuration method, and a virtual window configuration system.

Description of the Related Art

Augmented Reality (AR) technology can present virtual information through augmented reality glasses and combine it with real scenes to provide users with an "immersive experience". Augmented reality technology is often used in teaching, training, and remote assistance.

Due to the limited field-of-view (FOV) of augmented reality glasses, it is impossible to present all the information in front of the user at the same time, especially in the application of remote expert assistance. Augmented reality glasses must present a lot of information at the same time, such as a call window, a document window, a message window, etc. Users often need to individually drag a virtual window out of the main work area, and check the virtual information by turning their heads, so as not to obscure the main work area.

Therefore, how to automatically move the virtual window to a suitable position when re-opening the virtual window without obscuring the main work area has become one of the problems to be solved in this field.

BRIEF SUMMARY OF THE INVENTION

In accordance with one feature of the present invention, the present disclosure provides a virtual window configuration device that includes a processor, a depth detection sensor, a feature point detection sensor and a storage device. The processor is configured to generate a virtual window. The depth detection sensor is configured to generate depth information according to an image. The feature point detection sensor is configured to generate feature point information according to the image. The processor is configured to access programs stored in the storage device to implement a depth analysis module and a feature point analysis module. The depth analysis module is configured to analyze the depth information to generate a depth matrix, and find a depth configuration block in the image according to the depth matrix. The feature point analysis module is configured to analyze the feature point information to generate a feature point matrix, and find a feature point configuration block in the image according to the feature point matrix. Moreover, the processor moves the virtual window to the depth configuration block, or moves the virtual window to the feature point configuration block.

In accordance with one feature of the present invention, the present disclosure provides a virtual window configuration method. The virtual window configuration method includes the following steps. A processor generates a virtual window. A depth detection sensor generates depth information based on an image. The processor analyzes the depth information to generate a depth matrix. The processor finds a depth configuration block in the image using the depth matrix. A feature point detection sensor generates feature point information for the image. The processor analyzes the feature point information to generate a feature point matrix. The processor finds a feature point configuration block in the image using the feature point matrix. The processor moves the virtual window to the depth configuration block or the feature point configuration block.

In accordance with one feature of the present invention, the present disclosure provides a virtual window configuration system. The virtual window configuration system includes a processor, augmented reality glasses, a depth detection sensor and a feature point detection sensor. The processor is configured to generate a virtual window. The augmented reality glasses include a depth detection sensor and a feature point detection sensor. The depth detection sensor, configured to generate depth information according to an image. The feature point detection sensor is configured to generate feature point information according to the image. The augmented reality glasses transmit the depth information and the feature point information to the processor. The processor analyzes the depth information to generate a depth matrix, and finds a depth configuration block in the image according to the depth matrix. The processor analyzes the feature point information to generate a feature point matrix, and finds a feature point configuration block in the image according to the feature point matrix. The processor moves the virtual window to the depth configuration block, or moves the virtual window to the feature point configuration block.

The virtual window configuration device, the virtual window configuration method, and the virtual window configuration system shown in the embodiments of the present invention provide a method for dynamically moving a virtual window on a virtual reality device. Through depth detection and/or feature point detection, a target block that will not affect the user's operation can be automatically found, and the virtual window can be moved to this target block to reduce shading problems and the purpose of manual operation by users.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only example aspects of the disclosure and are not therefore to be considered to be limiting of its scope, the principles herein are described and explained with additional specificity and detail through the use of the accompanying drawings in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
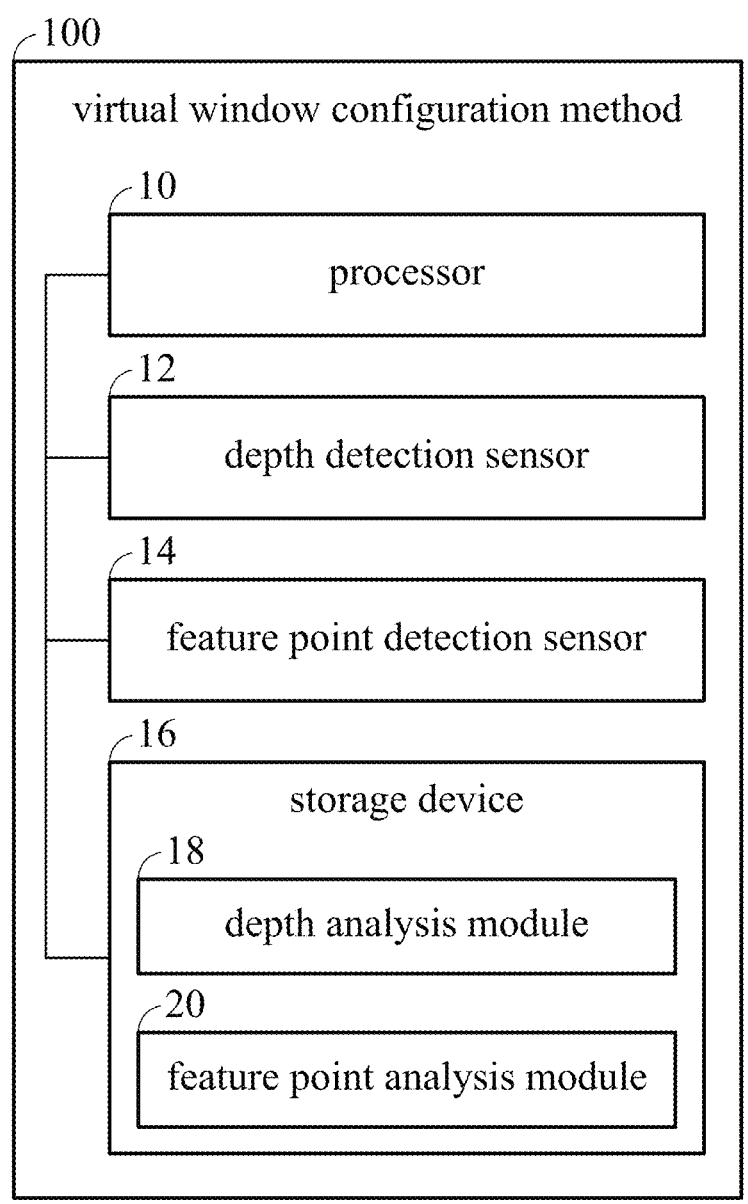
FIG. 1 is a block diagram of a virtual window configuration device in accordance with one embodiment of the present disclosure.
Figure 2:
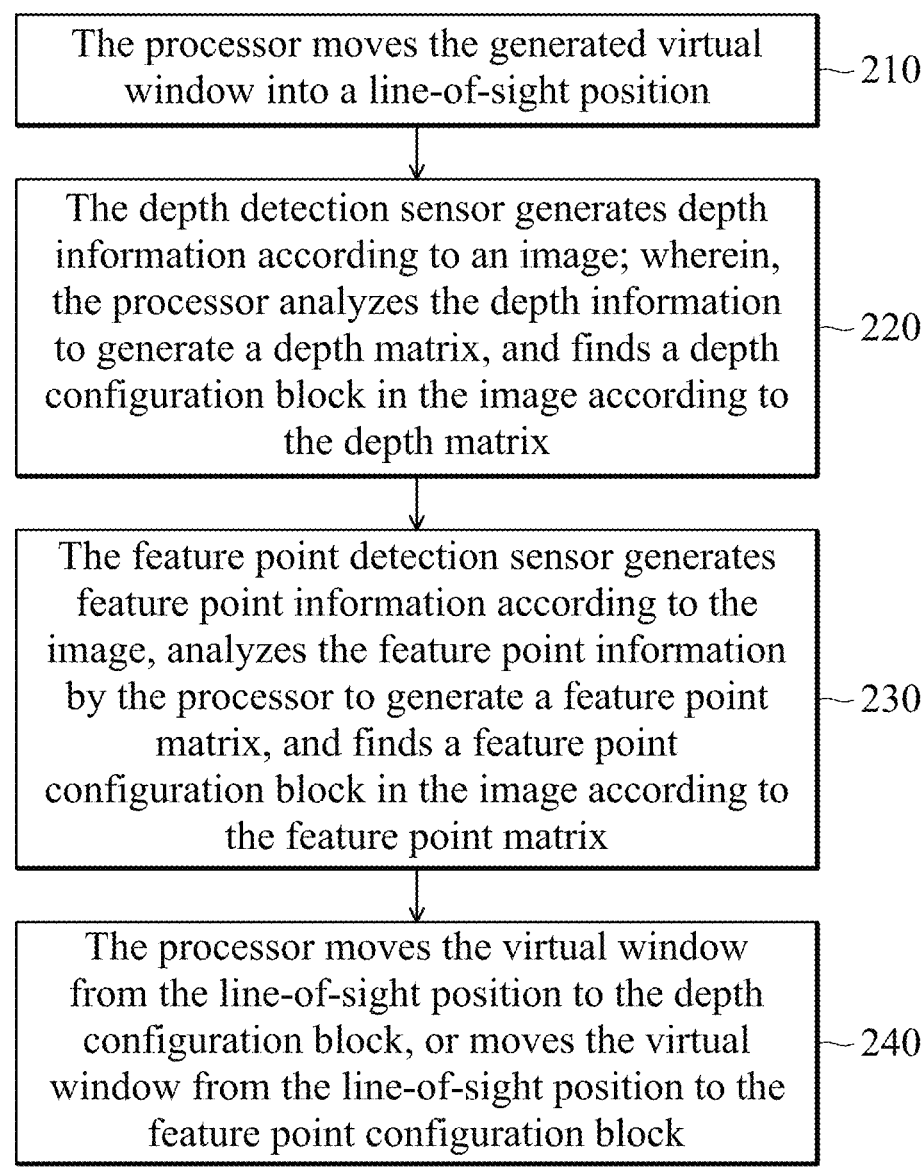
FIG. 2 is a block diagram of a virtual window configuration method in accordance with one embodiment of the present disclosure.

Please refer to FIGS. 1-2, FIG. 1 is a block diagram of a virtual window configuration device 100 in accordance with one embodiment of the present disclosure. FIG. 2 is a block diagram of a virtual window configuration method 200 in accordance with one embodiment of the present disclosure.

In one embodiment, as shown in FIG. 1, the virtual window configuration device 100 includes a processor 10, a depth detection sensor 12, a feature point detection sensor 14 and a storage device 16.

In one embodiment, the storage device 16 stores a depth analysis module 18 and a feature point analysis module 20. In one embodiment, the processor 10 is configured to access the programs stored in the storage device 16 to implement the functions of the depth analysis module 18 and the feature point analysis module 20.

In one embodiment, the depth analysis module 18 and the feature point analysis module 20 can be programs stored in the storage device 16. In one embodiment, the depth analysis module 18 and the feature point analysis module 20 can be implemented by firmware. In one embodiment, the depth analysis module 18 and the feature point analysis module 20 can be implemented by circuits, chips or other hardware, and are respectively electrically coupled to the storage device.

In one embodiment, the depth detection sensor 12, the feature point detection sensor 14, and the storage device 16 are each electrically coupled to the processor 10.

In one embodiment, the processor 10, the depth detection sensor 12, the feature point detection sensor 14, and the storage device 16 are located on an augmented reality device.

In one embodiment, the virtual window configuration device 100 can be applied to an augmented reality device, such as the augmented reality glasses 30, a mobile phone, or other devices capable of applying augmented reality. For the convenience of explanation, the following uses the augmented reality glasses 30 as an example.

In one embodiment, the virtual window configuration device 100 further includes a gravity sensor (G-Sensor) for detecting the turning position of the augmented reality glasses 30.

In one embodiment, the virtual window configuration device 100 further includes a camera, and the camera is configured to take pictures toward the turning position to obtain an image, and the image includes the actual scene. In one embodiment, the processor 10 calculates the line-of-sight position (e.g., the position the user is viewing) at which the virtual window is displayed on the image according to the turning position. In one embodiment, the camera is implemented with a charge coupled device (CCD) or a complementary metal-oxide semiconductor (CMOS).

In one embodiment, the processor 10 can be implemented by integrated circuits such as a micro controller, a microprocessor, a digital signal processor (DSP), and a Field Programmable Gate Array (FPGA), Application Specific Integrated Circuit (ASIC) or a logic circuit.

In one embodiment, the commonly used depth detection sensor 12 includes two-dimensional, three-dimensional lidar, stereoscopic camera, time of flight (ToF) camera, radio detection and ranging (RADAR) and ultrasonic radar, etc. Except the binocular camera uses binocular vision technology for distance measurement, all other sensors use time of flight technology. However, the present invention is not limited thereto, as long as a sensor capable of measuring the depth of each position in the image can be used as the depth detection sensor 12.

In one embodiment, the feature point detection sensor 14 is, for example, a surface photoelectric sensor, an image recognition sensor, a visual sensor, and the like. However, the invention is not limited thereto, as long as a sensor capable of detecting feature points in an image can be used as the feature point detection sensor 14. In one embodiment, the feature point detection sensor 14 and the camera are integrated into a camera module, and the captured image is configured to detect feature points in the image.

In one embodiment, the depth detection sensor 12, the feature point detection sensor 14 and another processor can be included in augmented reality glasses 30. The processor 10 can be located on another electronic device (such as a computer, a server or other electronic devices with computing and storage functions). The augmented reality glasses 30 are electrically coupled to another electronic device, and the augmented reality glasses 30 receive the virtual window from the processor 10. In this example, the augmented reality glasses 30 and another electronic device are regarded as a virtual window configuration system.

In one embodiment, the storage device 16 can be a read-only memory, flash memory, floppy disk, hard disk, optical disk, pen drive, magnetic tape, a network-accessible database, or a storage medium having the same function to implement it.

Figure 3:
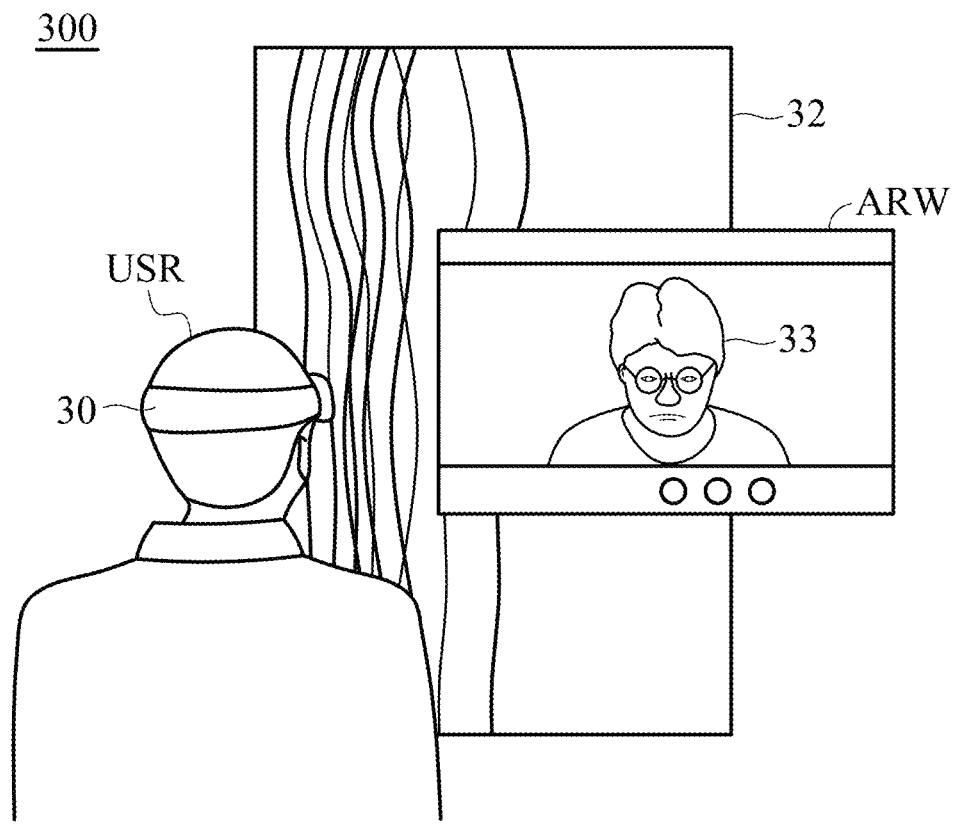
FIG. 3 is a schematic diagram of a virtual window configuration method in accordance with one embodiment of the present disclosure.

Please refer to FIGS. 2 to 3, the virtual window configuration method 200 can be implemented by the virtual window configuration device 100 or the aforementioned virtual window configuration system. FIG. 3 is a schematic diagram of a virtual window configuration method 300 in accordance with one embodiment of the present disclosure.

In step 210, the processor 10 moves the generated virtual window into a line-of-sight position.

In one embodiment, as shown in FIG. 3, if the user USR (e.g., a maintenance person) needs remote assistance, he/she wears the augmented reality glasses 30 so that he/she can see the main work area. The main work area 32 is the actual scene. In this example, the main work area 32 includes some circuits, the display of the augmented reality glasses 30 displays a virtual window ARW, and the virtual window ARW can be used to remotely guide the user USR how to repair the circuits of the main work area 32. For example, there is an instructor 33 in the virtual window ARW teaching how to repair. When the virtual window ARW is displayed, the processor 10 moves the virtual window ARW to the line-of-sight position of the user USR in the image displayed by the augmented reality glasses 30 according to a preset method.

However, this will cause the main work area 32 to overlap with the virtual window ARW, causing the main work area 32 of the user USR to be blocked by the virtual window ARW. Therefore, in the subsequent steps, it is necessary to find an appropriate space in the image to place the virtual window ARW.

In step 220, the depth detection sensor 12 generates depth information according to an image; wherein, the processor 10 analyzes the depth information to generate a depth matrix, and finds a depth configuration block in the image according to the depth matrix.

Figure 4:
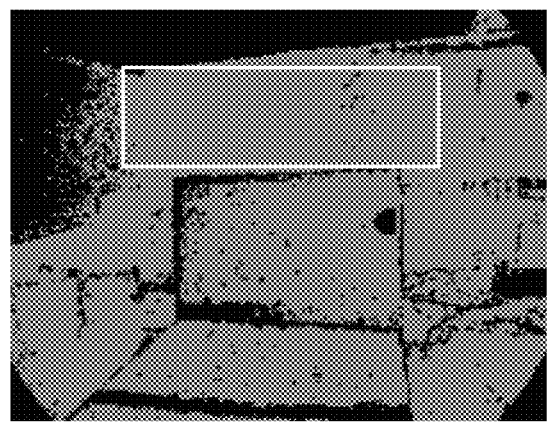
FIG. 4 is a schematic diagram of depth information in accordance with one embodiment of the present disclosure.
Figure 5:
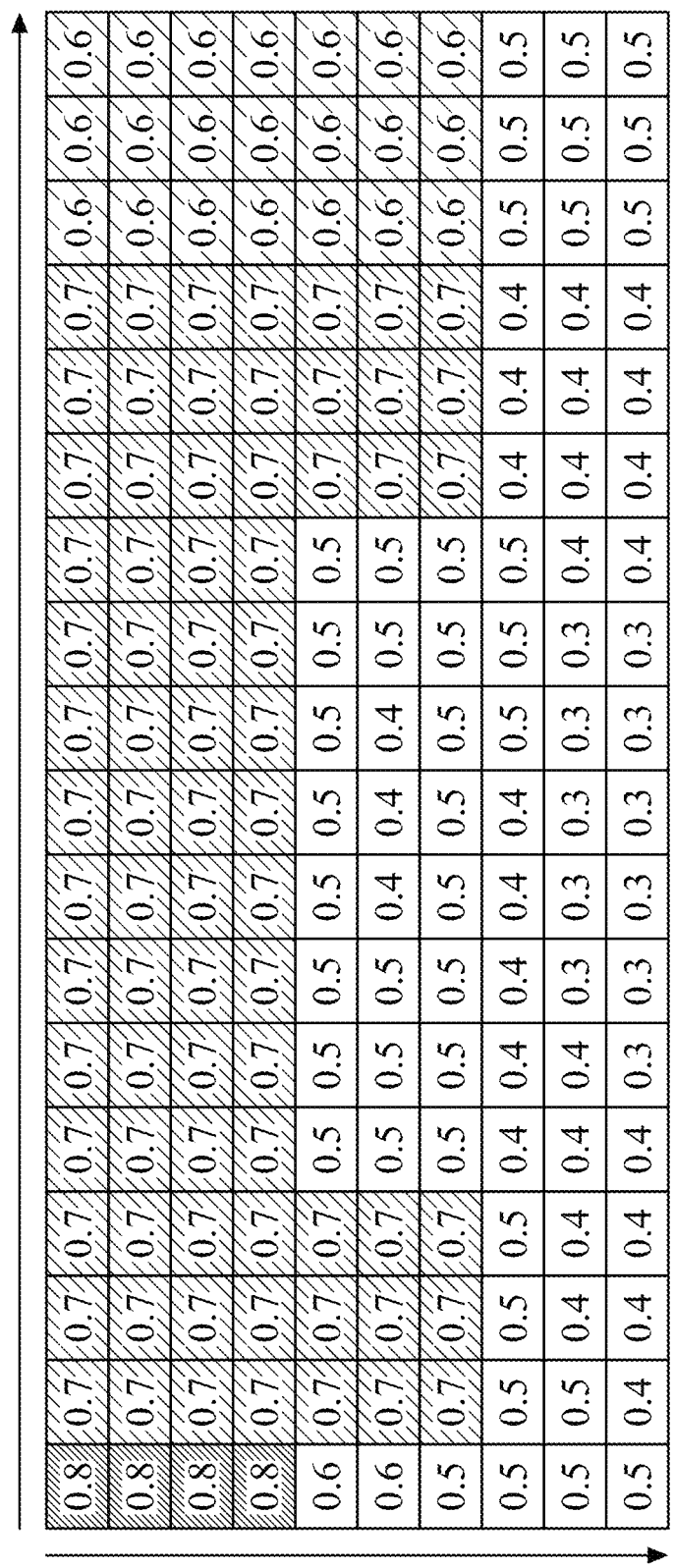
FIG. 5 is a schematic diagram of depth matrix in accordance with one embodiment of the present disclosure.

Please refer to FIGS. 4-5, FIG. 4 is a schematic diagram of depth information in accordance with one embodiment of the present disclosure. FIG. 5 is a schematic diagram of depth matrix in accordance with one embodiment of the present disclosure.

As shown in FIG. 4, the depth detection sensor 12 (for example, a time of flight distance sensor) uses light-emitting diodes to emit infrared light, which is reflected by the illuminating object to generate depth information. The framed part is relatively far from the user and the space is large enough to fit into the virtual window ARW.

Therefore, the depth information of each pixel through the time of flight distance sensor can be obtained, the depth information is stored in the array, and the array is scanned from left to right and top to bottom to find blocks with deeper depths. The depth detection sensor 12 and/or the processor 10 can generate the depth matrix in FIG. 5 according to the depth information.

In one embodiment, each grid in the depth matrix of FIG. 5 is a pixel, and the numerical unit in it is, for example, meters.

In one embodiment, the threshold value of the block size setting requires at least 5×3 pixels.

In one embodiment, the virtual window ARW is scalable.

In one embodiment, the processor 10 can read the predetermined block in the storage device 16, for example, 5×3 pixels, and the 5×3 pixels are used as the threshold value for the block size setting.

In one embodiment, the predetermined block can be the same size as the virtual window ARW, or a block with the same aspect ratio as the virtual window ARW.

For example, assuming that the virtual window ARW corresponds to the size of the depth information, setting a block that meets the depth threshold requires at least 5×3 pixels. Therefore, it is necessary to find a block whose horizontal axis is greater than 5 pixels and the block whose vertical axis is greater than 3 pixels need to go through the following steps.

The processor 10 first checks the deepest depth value in the depth matrix, and compares whether the block size is greater than 5×3 pixels. In this example, the deepest depth value is 0.8 (in this example, the larger the depth value, the denser the slashes). The deepest depth value has a block size of 1×4, which does not fit into 5×3 pixels.

Then continue to search down according to the depth value to find a block with a depth of 0.7, which can be split into candidate blocks such as 14×4, 3×7 and/or 3×7. Candidate blocks must be rectangular or square.

The block conforming to 5×3 pixels is a 14×4 candidate block. The processor 10 then search down according to the depth value to find the block with depth value 0.6. The size of the candidate block is 3×7 pixels, which does not fit into a 5×3 pixel and is smaller than a 14×4 block with a depth value of 0.7, Therefore, the processor 10 stops looking.

In one embodiment, if only the depth value is used for determining, the 14×4 block with the corresponding depth of 0.7 is set as the depth configuration block. Then according to the aspect ratio of virtual window ARW (16:9), the aspect ratio of virtual window ARW is calculated to be 1.77 times. Therefore, in the 14×4 block, the actual size of the virtual window ARW that can be placed is the candidate block size of (4*1.77)×4=7×4. Finally, from the coordinate position of the flight distance sensor and the corresponding pixel, the three-dimensional space coordinate and size corresponding to the candidate block can be calculated, and the virtual window ARW is moved to the three-dimensional coordinate (the position of the depth configuration block).

In one embodiment, the depth value of each pixel in the depth configuration block is greater than the depth threshold (for example, greater than 0.5, so in the above embodiment, only the block size with a depth value of 0.6-0.8 is analyzed). In one embodiment, the area of the depth configuration block is larger than the virtual window ARW.

In one embodiment, the processor 10 adjusts the virtual window ARW to a size that conforms to the depth configuration block according to the original aspect ratio of the virtual window ARW, and it moves the virtual window ARW from the line-of-sight position to the depth configuration block.

In step 230, the feature point detection sensor 14 generates feature point information according to the image, analyzes the feature point information by the processor 10 to generate a feature point matrix, and finds a feature point configuration block in the image according to the feature point matrix.

Figure 6:
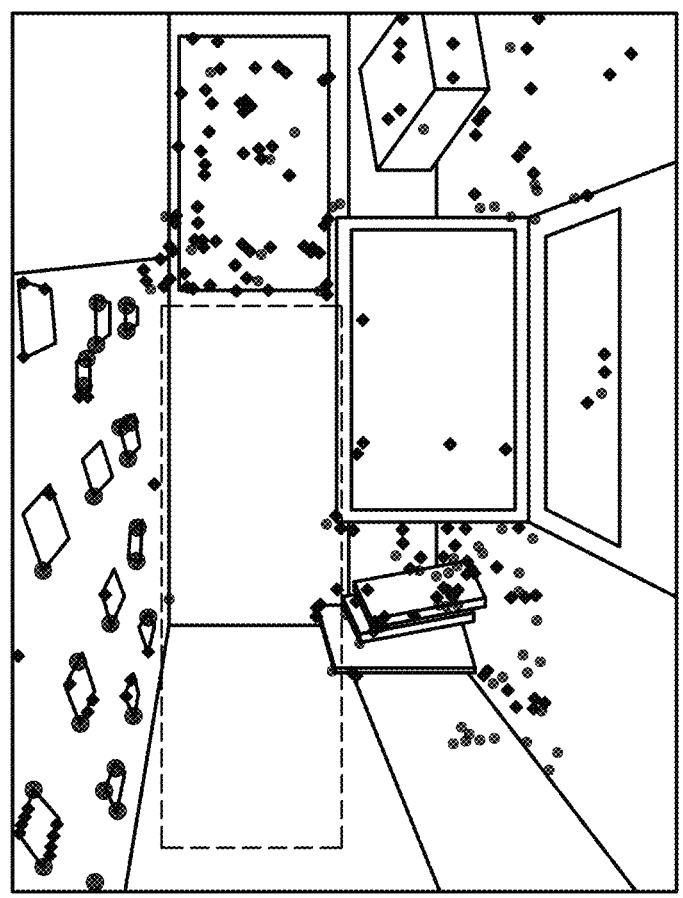
FIG. 6 is a schematic diagram of feature point information in accordance with one embodiment of the present disclosure.
Figure 7:
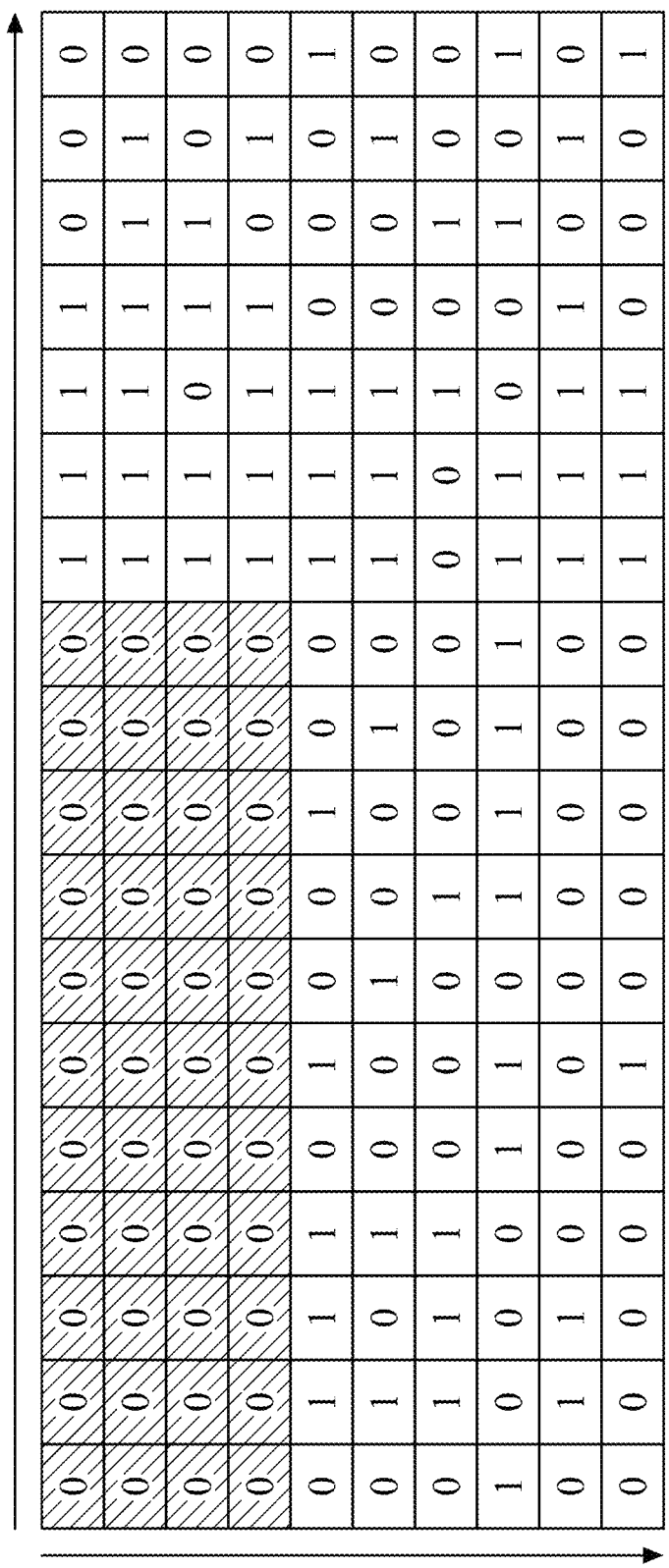
FIG. 7 is a schematic diagram of a feature point matrix in accordance with one embodiment of the present disclosure.

Please refer to FIGS. 6-7. FIG. 6 is a schematic diagram of feature point information in accordance with one embodiment of the present disclosure. FIG. 7 is a schematic diagram of a feature point matrix in accordance with one embodiment of the present disclosure.

In one embodiment, the processor 10 uses the image obtained by the camera to use a known image feature detection algorithm to know which pixels of the entire image contain feature point information (as shown in FIG. 6). The processor 10 stores the feature point information in the feature point array for scanning (as shown in FIG. 7), and finds blocks without feature points (as shown in FIG. 6, which is framed by a dotted line).

In one embodiment, a known image feature detection algorithm can find out feature points such as corners, blocks, sharps, etc. in an image based on graphics. These feature points can be displayed in the form of dots on FIG. 6, so a block without feature points can be seen, and the block can be selected.

Therefore, we can obtain the feature point information of each pixel through the known image feature detection algorithm, and store the feature point information in the feature point array. The processor 10 scans the feature point array from left to right and from top to bottom to find out the block whose number of feature points is under the feature point threshold. The feature point threshold is for example 0, 1 or 2. The processor 10 determines whether the sum of the feature points in the block is under the feature point threshold, and finds the largest block that is under the feature point threshold. The feature point detection sensor 14 and/or the processor 10 can generate the feature point array shown in FIG. 7 according to the feature point information.

In one embodiment, each grid in the feature point array in FIG. 7 is a pixel, and the value in each grid is a feature value, for example, 0 represents no feature point, and 1 represents containing feature point.

For example, assuming that the virtual window ARW corresponds to the size of the feature point information, the set predetermined block needs at least 5×3 pixels. Therefore, it is necessary to find a block whose horizontal axis is greater than 5 pixels and a block whose vertical axis is greater than 3 pixels, and the following steps need to be performed.

The processor 10 first finds a block without feature points (i.e., the feature value of the pixel grid is 0), and finds the largest block, which is an 11×4 block in the example of FIG. 7.

After confirming that the 11×4 block is larger than the required 5×3 pixels, the processor 10 sets the 11×4 block (indicated by diagonal lines on the upper left and lower right) as a candidate block. In one embodiment, the candidate block must be a rectangle or a square. In this example, the size of the candidate block is greater than or equal to the required predetermined block size, such as 5×3 pixels. Therefore, the processor 10 sets the candidate block as the feature point configuration block.

In response to setting when only the feature point information is configured to determine, the processor 10 sets the matching 11×4 block as a candidate block. Then processor 10 calculates that the aspect ratio of the virtual window ARW is 1.77 times according to the aspect ratio of the virtual window (16:9). Therefore, in the 11×4 block, the actual size that can be put into the virtual window ARW is 7×4. Finally, from the coordinate position of the camera and the corresponding pixel, the processor 10 can calculate the three-dimensional space coordinate and size corresponding to the candidate block. The processor 10 moves the virtual window ARW to this 3D coordinate (which is the feature point configuration block).

The method by the coordinate position of the camera and the corresponding pixel, for example: the virtual window occupies 7×4 pixels in the field of view (FOV). According to the known FOV calculation formula, when the processor 10 obtains the focal length of the camera and the distance from the camera to the object (i.e., depth information), the actual corresponding size of the virtual window (i.e., the field of view) can be derived. The position of the three-dimensional space coordinate is based on the current three-dimensional coordinate position of augmented reality (AR) glasses plus depth information, so that the three-dimensional coordinate position corresponding to the object in front of the eyes can be inferred.

In one embodiment, the number of feature points in the feature point configuration block is under the feature point threshold, and the area of the feature point configuration block is larger than the predetermined block.

In one embodiment, the processor 10 adjusts the virtual window ARW to a size that conforms to the feature point configuration block according to the original aspect ratio of the virtual window ARW. Moreover, the processor 10 moves the virtual window ARW from the line-of-sight position to the feature point configuration block.

In step 240, the processor 10 moves the virtual window ARW from the line-of-sight position to the depth configuration block, or moves the virtual window ARW from the line-of-sight position to the feature point configuration block.

Figure 8:
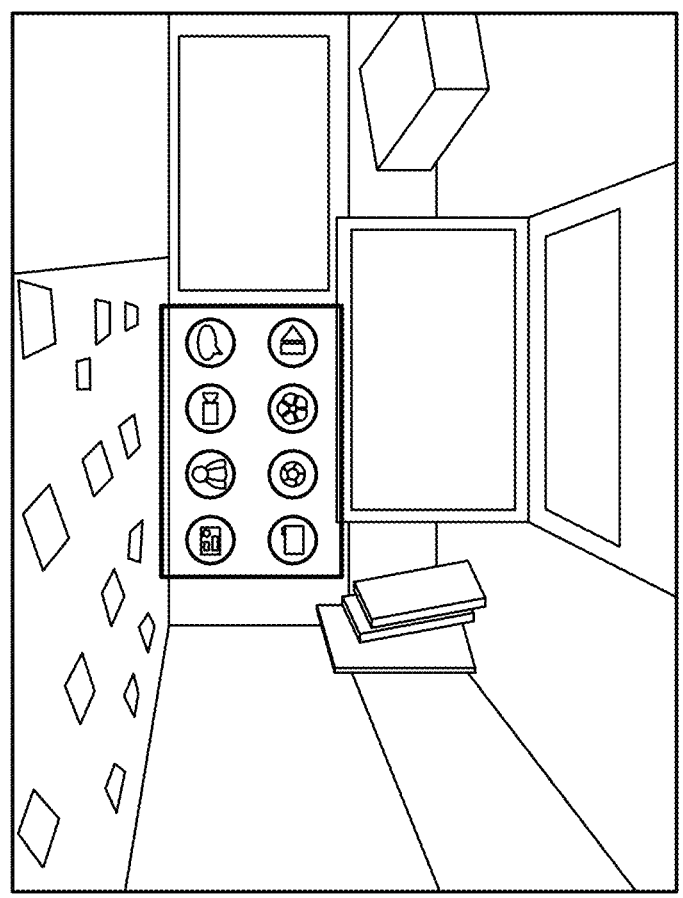
FIG. 8 is a schematic diagram of a mobile virtual window in accordance with one embodiment of the present disclosure.

Please refer to FIG. 8. FIG. 8 is a schematic diagram of a mobile virtual window ARW in accordance with one embodiment of the present disclosure. In one embodiment, when the depth configuration block is calculated, the processor 10 can move the virtual window ARW from the line-of-sight position to the depth configuration block. In one embodiment, when the feature point configuration block is calculated, the virtual window ARW is moved from the line-of-sight position to the feature point configuration block. In one embodiment, when the depth configuration block and the feature point configuration block are calculated, the processor 10 can take the overlapping block (i.e., the intersection block) between the two. If the overlapping block is larger than the pixels required by the virtual window ARW, the virtual window ARW is moved to the overlapping block.

In one embodiment, in response to the processor 10 determining that the area of the overlapping block is greater than or equal to an area of the predetermined block, the processor 10 transmits coordinates of the overlapping block to the augmented reality glasses 30. Another processor in the augmented reality glasses 30 moves the virtual window ARW to the overlapping block according to the coordinates of the overlapping block.

In one embodiment, the augmented reality glasses 30 moves the virtual window ARW to the depth configuration block transmitted by the processor 10, or moves the virtual window ARW to the feature point configuration block transmitted by the processor 10.

In one embodiment, the processor 10 or another processor moves the virtual window ARW to the depth configuration block, or moves the virtual window ARW to the feature point configuration block. Another processor can be included in augmented reality glasses 30. The processor 10 can be located on another electronic device.

In one embodiment, the depth value of each pixel in the depth configuration block is greater than the depth threshold, and the area of the depth configuration block is greater than or equal to the predetermined block. The number of feature points in the feature point configuration block is under the feature point threshold, and the area of the feature point configuration block is greater than or equal to the predetermined block. The processor 10 analyzes the depth configuration block and the feature point configuration block at the same time to find an overlapping block, and determines whether the area of the overlapping block is greater than or equal to the predetermined block. In response to the processor 10 determining that the area of the overlapping block is larger than the predetermined block, the processor 10 moves the virtual window ARW from the line-of-sight position to the overlapping block.

In one embodiment, in response to the processor 10 determining that the area of the overlapping block is not greater than or equal to the predetermined block, the processor 10 does not move the position of the virtual window ARW, or the processor 10 does not move the virtual window ARW to the depth configuration block or the feature point configuration block.

In one embodiment, the processor 10 cannot find a depth configuration block in which the depth value of each pixel is greater than the depth threshold and the area is greater than or equal to the predetermined block, and the processor 10 finds the number of feature points in the feature point configuration blocks that is under the feature point threshold, and the area of the feature point configuration block is greater than or equal to the feature point configuration block of the predetermined block, and moves the virtual window ARW to the feature point configuration block. In one embodiment, the processor 10 cannot find that a depth value of each pixel in the depth configuration block is greater than a depth threshold, and cannot find a depth configuration block with an area greater than or equal to the predetermined block, also the processor 10 cannot find a feature point configuration block whose number of feature points in the feature point configuration blocks is under the feature point threshold, and whose area is greater than or equal to the predetermined block. Then, the processor 10 leaves the virtual window ARW in place.

In one embodiment, in response to the processor 10 determining that the area of the overlapping block is greater than or equal to the area of the predetermined block, the processor 10 adjusts the virtual window ARW to a size that conforms to the overlapping block according to the original aspect ratio of the virtual window ARW, and it moves the virtual window ARW from the line-of-sight position to the overlapping block.

Figure 9:
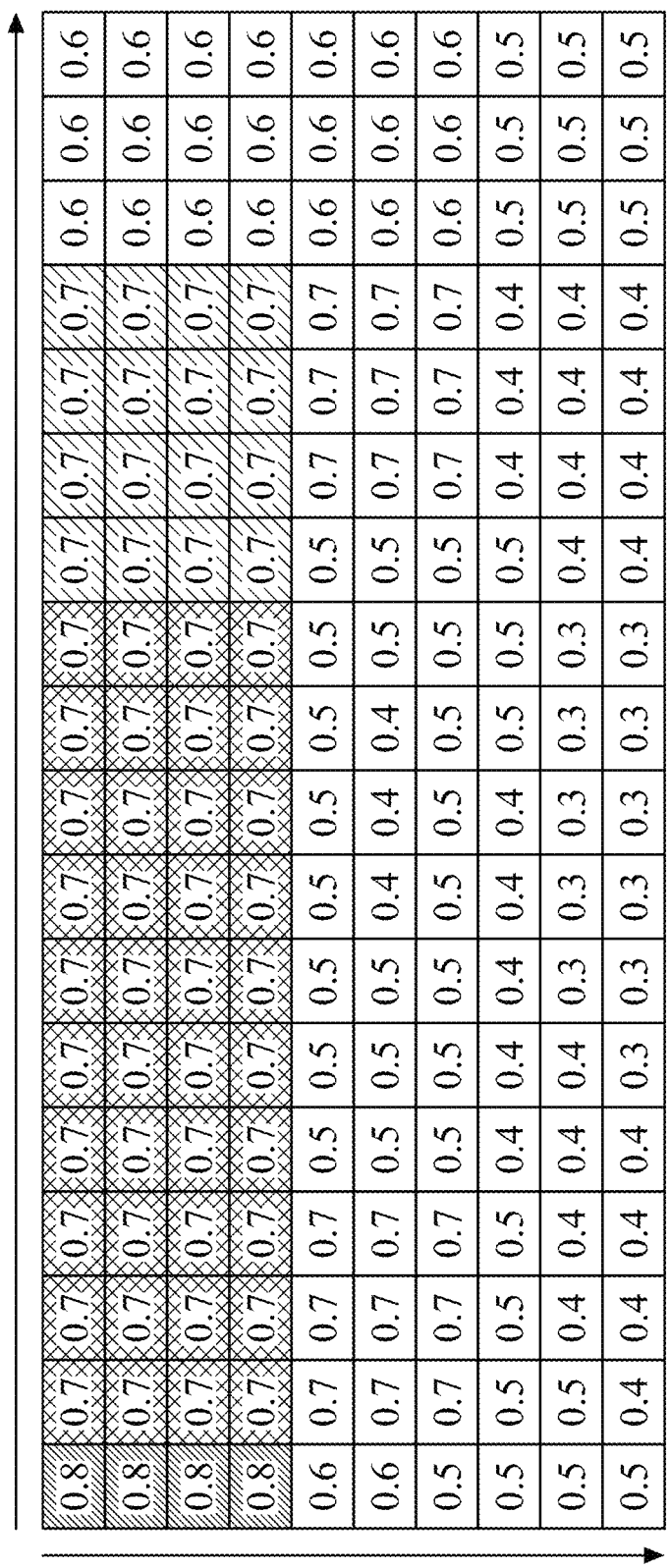
FIG. 9 is a schematic diagram of a mobile virtual window ARW in accordance with one embodiment of the present disclosure.

Please refer to FIG. 9, which is a schematic diagram of a mobile virtual window ARW in accordance with one embodiment of the present disclosure.

If the selected feature point configuration block in FIG. 7 is overlapped with the depth configuration block in FIG. 5, the overlapping block in FIG. 9 can be obtained. Each grid (pixel) in the overlapping block is marked with slashes on the upper right and lower left and the upper left and lower right.

In response to the processor 10 determining that the area of the overlapping block (for example, the area of the overlapping block in FIG. 9) is greater than or equal to the predetermined block, the processor 10 adjusts the virtual window ARW to match the size of the overlapping block according to the original aspect ratio of the virtual window ARW, and the processor 10 moves the virtual window ARW from the line-of-sight position to the overlapping block.

In one embodiment, the overlapping block is the best placement position of the virtual window ARW.

Figure 10:
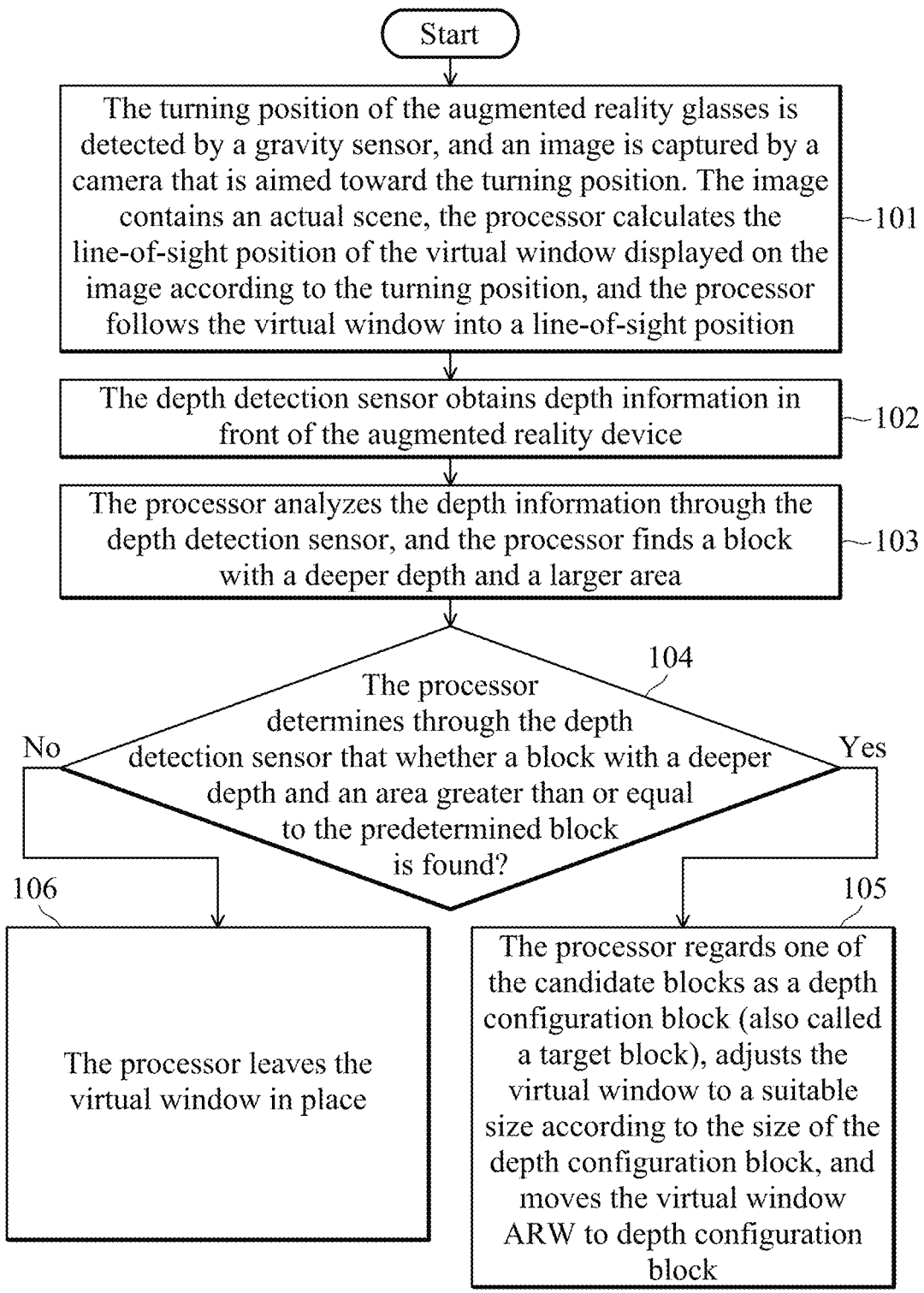
FIG. 10 is a flowchart of moving a virtual window according to depth information in accordance with one embodiment of the present disclosure.
Figure 11:
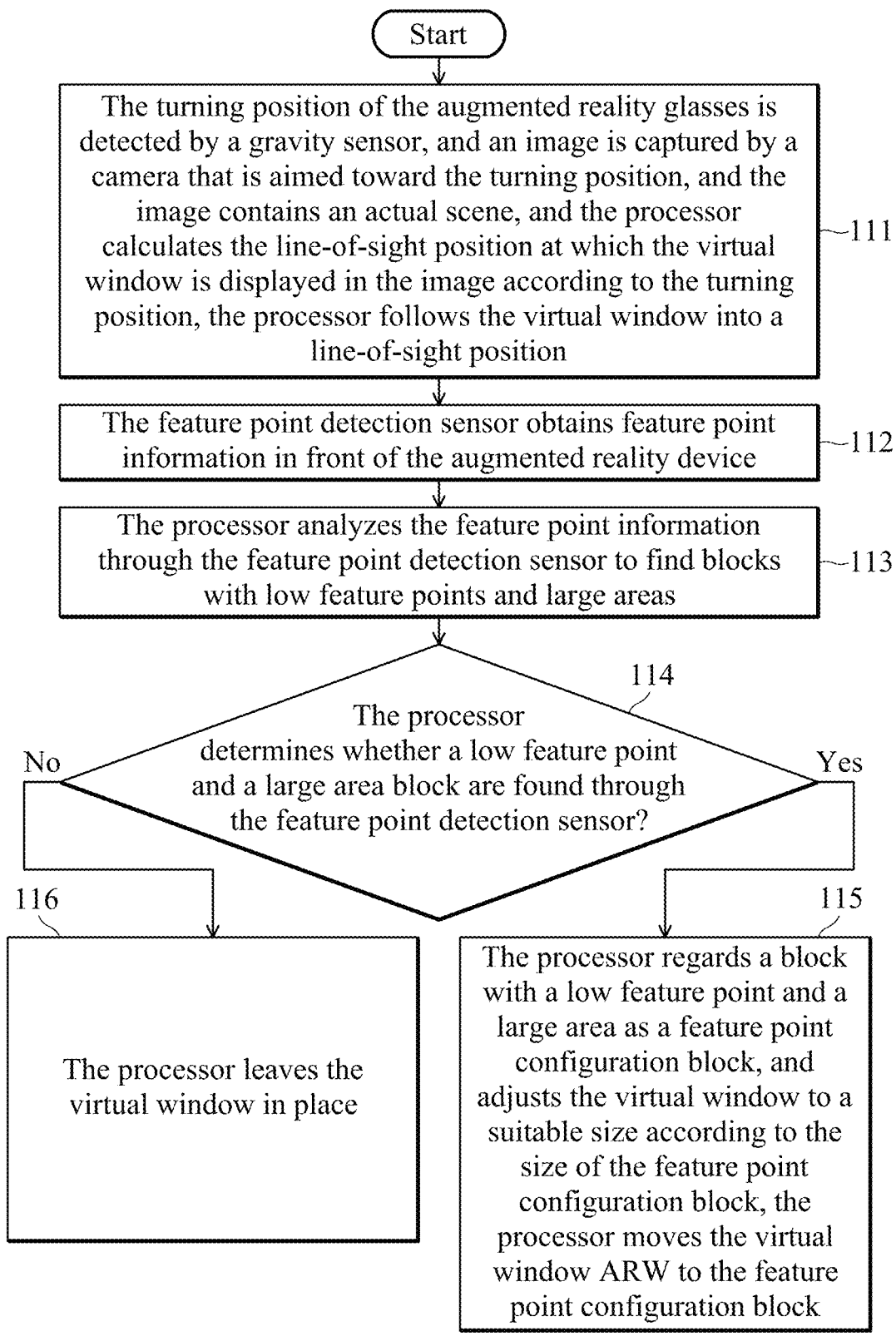
FIG. 11 is a flowchart of moving a virtual window according to feature point information in accordance with one embodiment of the present disclosure.
Figure 12A:
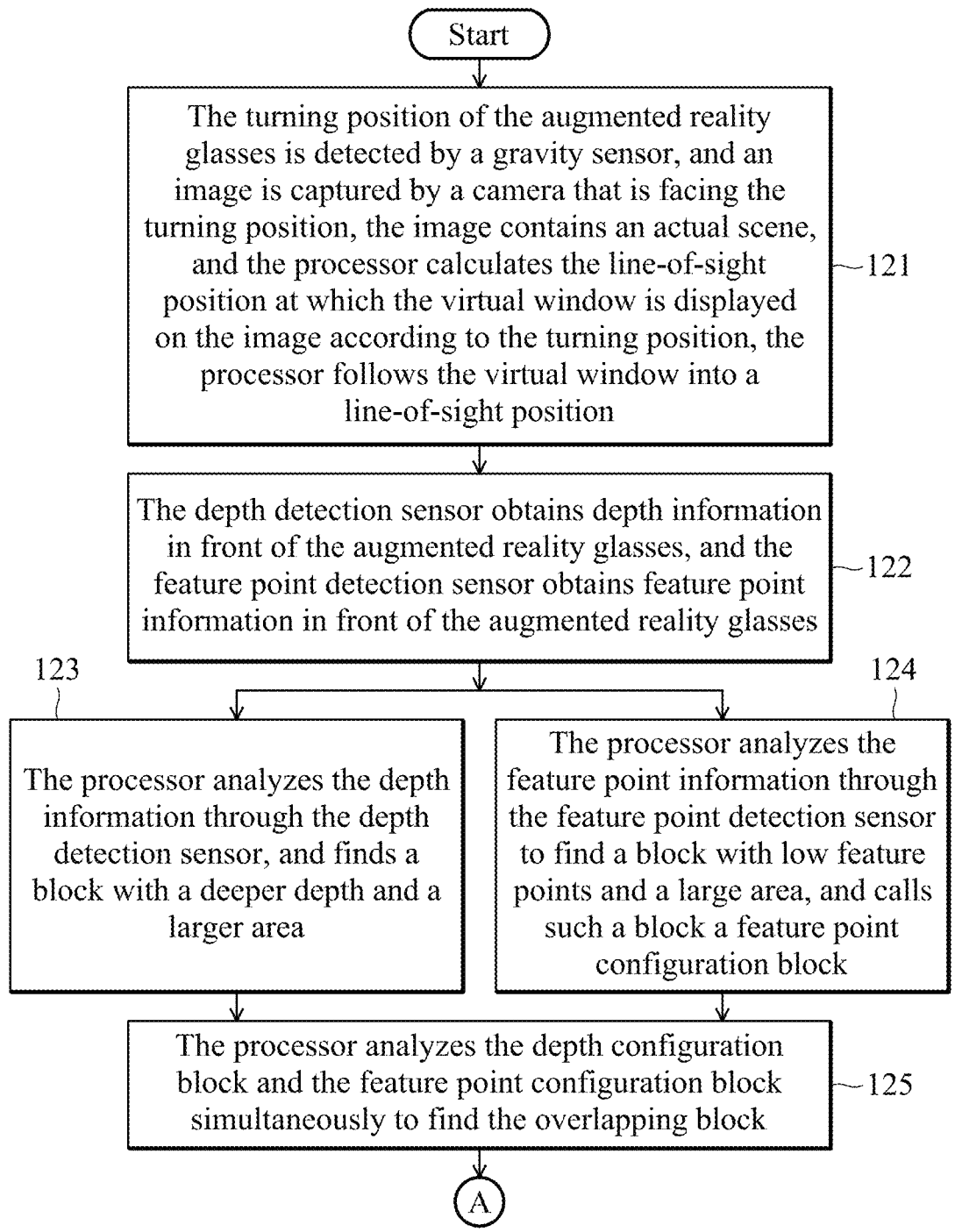
FIGS. 12A-12B are flowcharts of moving a virtual window ARW according to depth information and feature point information in accordance with one embodiment of the present disclosure.
Figure 12B:
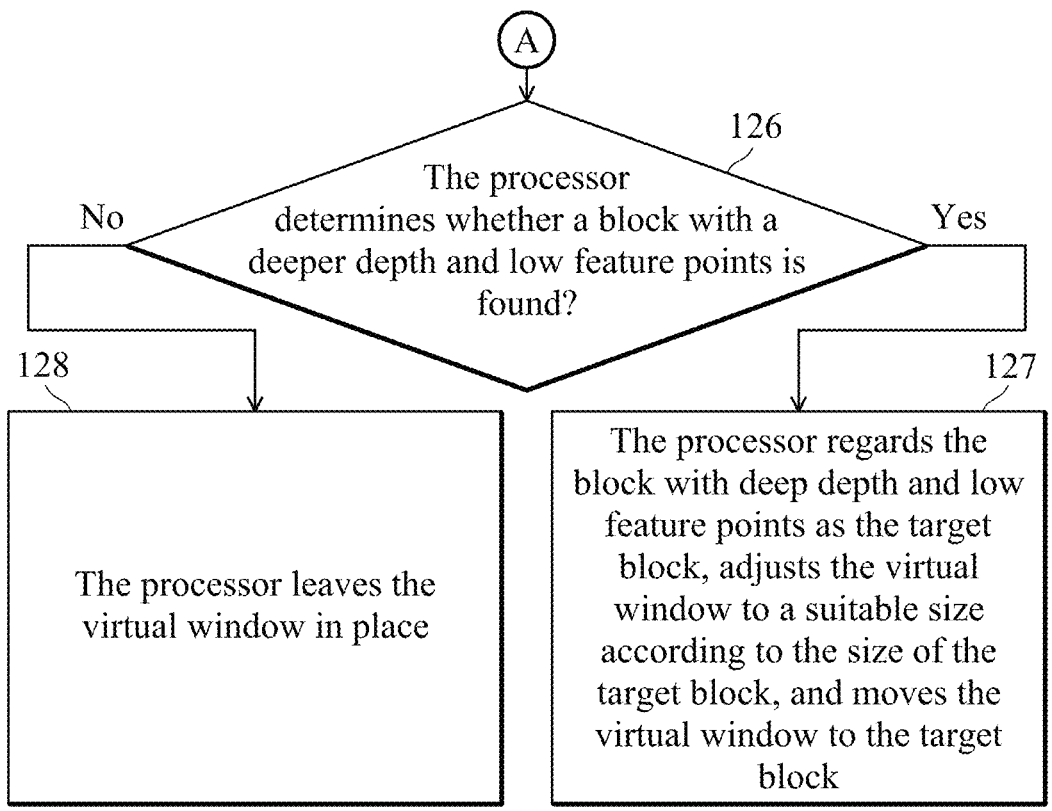
Figure 13A:
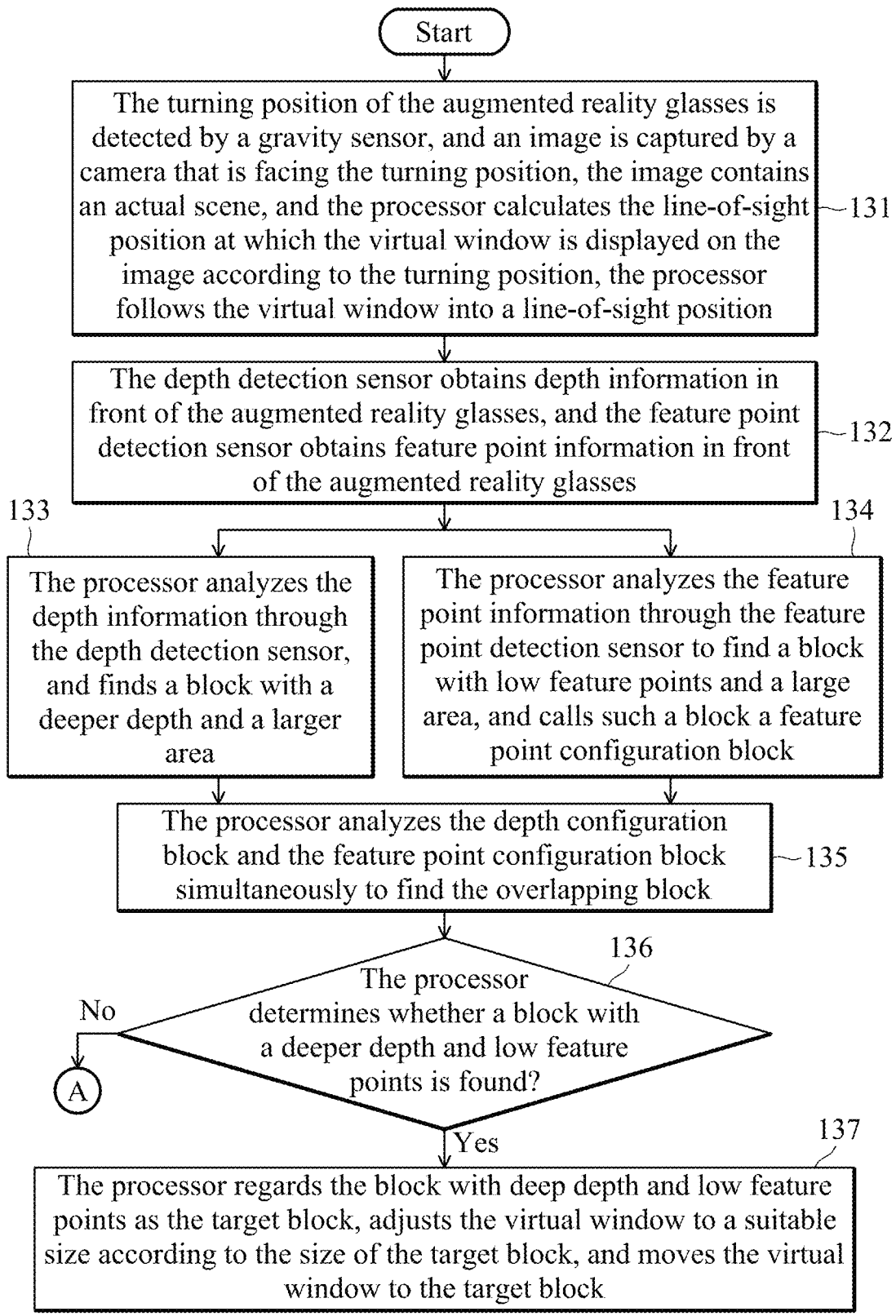
FIGS. 13A-13B is a flowchart of moving a virtual window according to depth information and feature point information in accordance with one embodiment of the present disclosure.
Figure 13B:
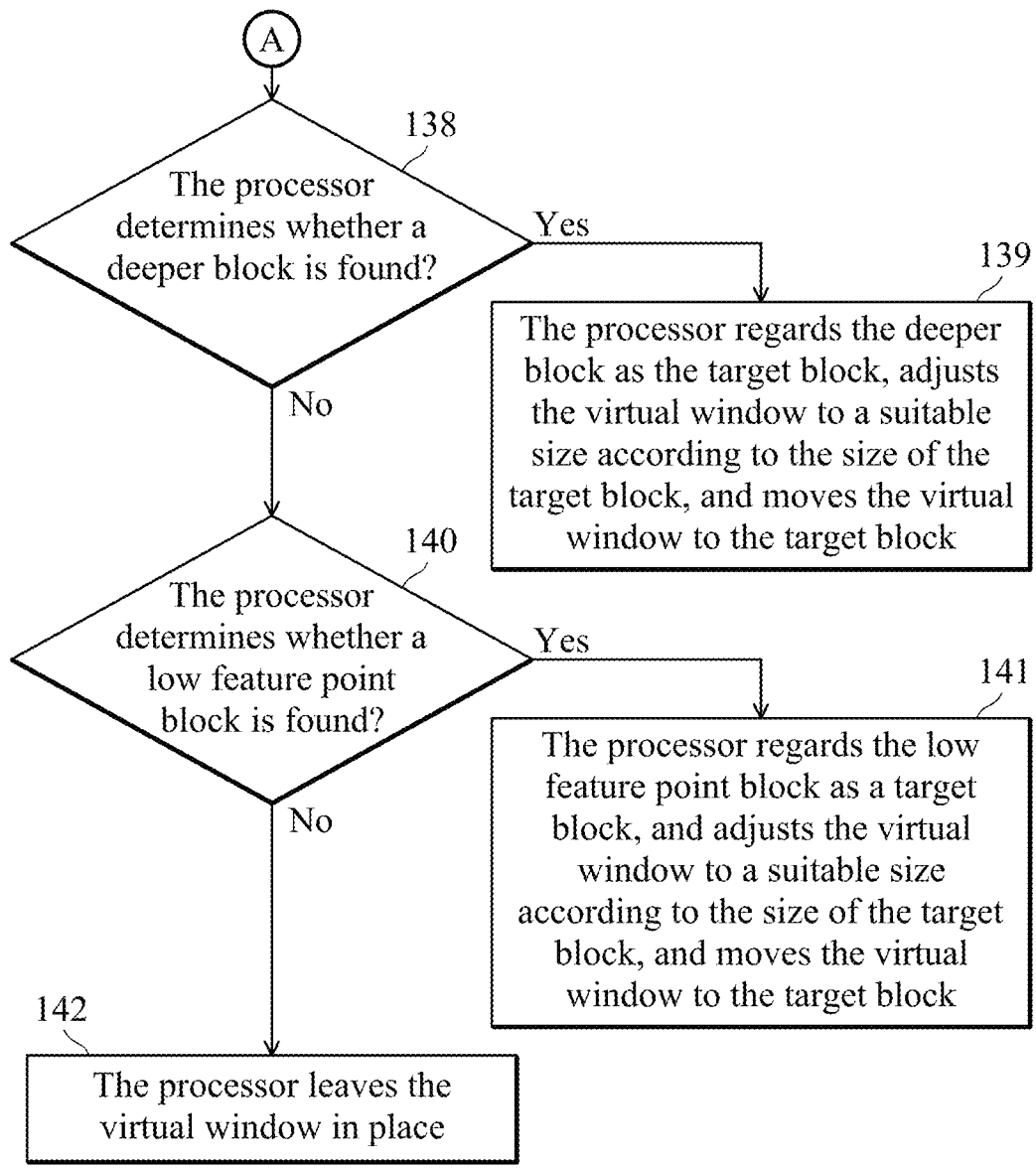

Please refer to FIGS. 10-13A and 13B. FIG. 10 is a flowchart of moving a virtual window ARW according to depth information in accordance with one embodiment of the present disclosure. FIG. 11 is a flowchart of moving a virtual window ARW according to feature point information in accordance with one embodiment of the present disclosure. FIGS. 12A-12B are flowcharts of moving a virtual window ARW according to depth information and feature point information in accordance with one embodiment of the present disclosure. FIGS. 13A-13B is a flowchart of moving a virtual window ARW according to depth information and feature point information in accordance with one embodiment of the present disclosure.

FIG. 10 is a flow chart of moving a virtual window ARW according to depth information in accordance with one embodiment of the present disclosure.

In step 101, the turning position of the augmented reality glasses 30 is detected by a gravity sensor, and an image is captured by a camera that is aimed toward the turning position. The image contains an actual scene. The processor 10 calculates the line-of-sight position of the virtual window ARW displayed on the image according to the turning position. The processor 10 follows the virtual window ARW into a line-of-sight position.

In one embodiment, the line-of-sight position can be a position in front of the user USR.

In step 102, the depth detection sensor 12 obtains depth information in front of the augmented reality device.

In one embodiment, the augmented reality device can be augmented reality glasses 30, a mobile phone, or other augmented reality-applicable devices. For the convenience of explanation, in the following embodiments in FIGS. 10 to 13, the augmented reality glasses 30 are used as an example.

In step 103, the processor 10 analyzes the depth information through the depth detection sensor 12, and the processor 10 finds a block with a deeper depth and a larger area.

In one embodiment, the deeper block refers to a block that is farther from the augmented reality glasses 30 and greater than the depth threshold.

In step 104, the processor 10 determines through the depth detection sensor 12 that whether a block with a deeper depth and an area greater than or equal to the predetermined block is found. If yes, the step 105 is performed. If not, the step 106 is performed.

In one embodiment, the depth detection sensor 12 can transmit depth information to the processor 10. The processor 10 determines that whether a block with a deeper depth and an area greater than or equal to the predetermined block is found.

In one embodiment, the processor 10 regards a block with a deep depth and an area greater than or equal to the predetermined block as a candidate block.

In step 105, the processor 10 regards one of the candidate blocks as a depth configuration block (also called a target block), adjusts the virtual window ARW to a suitable size according to the size of the depth configuration block, and moves the virtual window ARW to depth configuration block. In one embodiment, the processor 10 can select the block with the largest area from the plurality of candidate blocks as the depth configuration block.

In one embodiment, it is assumed that the size of the virtual window ARW needs to be at least 5×3 pixels.

Therefore, it is necessary to find the pixels whose horizontal axis is greater than 5, and the blocks whose vertical axis is greater than 3 pixels. The processor 10 designates a block (for example, a size of 14×4) that matches the depth (for example, 0.7 meters) as the depth configuration block. Then, according to the aspect ratio of the virtual window ARW (for example, 16:9), the aspect ratio of the virtual window ARW is calculated to be 1.77 times. Thus, in the 14×4 block, the actual size of the virtual window ARW that can be placed is the candidate block size of (4*1.77)×4=7×4. Finally, from the coordinate position of the time of flight distance sensor and the corresponding pixel, the coordinates and size of the three-dimensional space corresponding to the candidate block can be calculated. The processor 10 moves the virtual window ARW to the three-dimensional coordinates (the position of the depth configuration block), thereby adjusting the virtual window ARW to a suitable size.

In step 106, the processor 10 leaves the virtual window ARW in place.

Next, please refer to FIG. 11, which is a flowchart of moving the virtual window ARW in accordance with one embodiment of the present disclosure.

In step 111, the turning position of the augmented reality glasses 30 is detected by a gravity sensor, and an image is captured by a camera that is aimed toward the turning position. Moreover, the image contains an actual scene, and the processor 10 calculates the line-of-sight position at which the virtual window ARW is displayed in the image according to the turning position. The processor 10 follows the virtual window ARW into a line-of-sight position.

In step 112, the feature point detection sensor 14 obtains feature point information in front of the augmented reality device (e.g., the augmented reality glasses 30).

In step 113, the processor 10 analyzes the feature point information through the feature point detection sensor 14 to find blocks with low feature points and large areas.

In one embodiment, the large-area block refers to a block whose area is greater than or equal to the predetermined block. The low feature point block is a block in which the number of feature points is under the feature point threshold.

In step 114, the processor 10 determines whether a low feature point and a large area block are found through the feature point detection sensor 14. If yes, the step 115 is performed. If no, the step 116 is performed.

In one embodiment, the feature point detection sensor 14 can transmit the feature point information to the processor 10, and the processor 10 determines whether a low feature point and a large area block are found.

In step 115, the processor 10 regards a block with a low feature point and a large area as a feature point configuration block (i.e., a target block), and adjusts the virtual window ARW to a suitable size according to the size of the feature point configuration block. The processor 10 moves the virtual window ARW to the feature point configuration block.

Therefore, the number of feature points in the feature point configuration block is under the feature point threshold, and the area of the feature point configuration block is greater than or equal to the predetermined block.

In one embodiment, it is assumed that the size of the feature point information corresponding to the virtual window ARW requires at least 5×3 pixels. Therefore, it is necessary to find the pixels whose horizontal axis is greater than 5, and the blocks whose vertical axis is greater than 3 pixels. In response to setting the feature point information for determine, the processor 10 sets the matched 11×4 block as a candidate block. Then, according to the aspect ratio of the virtual window (16:9), the aspect ratio of the virtual window ARW is calculated to be 1.77 times. Therefore, in the 11×4 block, the actual size that can be put into the virtual window ARW is 7×4. Finally, from the coordinate position of the camera and the corresponding pixel, the processor 10 can calculate the three-dimensional space coordinate and size corresponding to the candidate block, and move the virtual window ARW to the three-dimensional coordinate (which is the feature point configuration block).

In step 116, the processor 10 leaves the virtual window ARW in place.

Next, please refer to FIGS. 12A-12B, which are flowcharts of moving the virtual window ARW according to depth information and feature point information in accordance with one embodiment of the present disclosure.

In step 121, the turning position of the augmented reality glasses 30 is detected by a gravity sensor, and an image is captured by a camera that is facing the turning position. The image contains an actual scene. Moreover, the processor 10 calculates the line-of-sight position at which the virtual window ARW is displayed on the image according to the turning position. The processor 10 follows the virtual window ARW into a line-of-sight position.

In step 122, the depth detection sensor 12 obtains depth information in front of the augmented reality glasses 30, and the feature point detection sensor 14 obtains feature point information in front of the augmented reality glasses 30.

In step 123, the processor 10 analyzes the depth information through the depth detection sensor 12, and finds a block with a deeper depth and a larger area.

In one embodiment, the block with a deeper depth refers to a block that is farther from the augmented reality glasses 30 and greater than the depth threshold, and such a block is referred to as a depth configuration block.

In step 124, the processor 10 analyzes the feature point information through the feature point detection sensor 14 to find a block with low feature points and a large area, and calls such a block a feature point configuration block.

In one embodiment, the large-area block refers to a block whose area is greater than or equal to the predetermined block. The low feature point block is a block in which the number of feature points is under the feature point threshold.

The steps 123 and 124 can be executed sequentially, out of sequence, or in parallel.

In step 125, the processor 10 analyzes the depth configuration block and the feature point configuration block simultaneously to find the overlapping block.

In step 126, the processor 10 determines whether a block with a deeper depth and low feature points is found. If yes, the step 127 is performed. If not, the step 128 is performed.

In step 127, the processor 10 regards the block with deep depth and low feature points as the target block, adjusts the virtual window ARW to a suitable size according to the size of the target block, and moves the virtual window ARW to the target block.

In step 128, the processor 10 leaves the virtual window ARW in place.

Next, please refer to FIGS. 13A-13B. FIGS. 13A-13B are flowcharts of moving the virtual window ARW according to depth information and feature point information in accordance with one embodiment of the present disclosure. Steps 131 to 137 in FIGS. 13A to 13B are respectively the same as steps 121 to 127 in FIGS. 12A-12B, and therefore are not repeated here. In step 136 of FIGS. 13A to 13B, if the determination is NO, the process proceeds to step 138.

In step 138, the processor 10 determines whether a deeper block is found. If yes, the step 139 is performed. If not, the step 140 is performed.

In one embodiment, the deeper block refers to the depth configuration block. The depth value of each pixel in the depth configuration block is greater than the depth threshold. The area of the depth configuration block is greater than or equal to the predetermined block.

In step 139, the processor 10 regards the deeper block as the target block, adjusts the virtual window ARW to a suitable size according to the size of the target block, and moves the virtual window ARW to the target block.

In step 140, the processor 10 determines whether a low feature point block is found. If yes, the step 141 is performed. If no, the step 142 is performed.

In one embodiment, the low feature point block is a block in which the number of feature points is under the feature point threshold.

In one embodiment, the low feature point block is regarded as a feature point configuration block, the number of feature points in the feature point configuration block is under the feature point threshold, and the area of the feature point configuration block is greater than or equal to the predetermined block.

In step 141, the processor 10 regards the low feature point block as a target block, and adjusts the virtual window ARW to a suitable size according to the size of the target block, and moves the virtual window ARW to the target block.

In step 142, the processor 10 leaves the virtual window ARW in place.

The virtual window configuration device, the virtual window configuration method, and the virtual window configuration system shown in the embodiments of the present invention provide a method for dynamically moving a virtual window on a virtual reality device. Through depth detection and/or feature point detection, a target block that will not affect the user's operation can be automatically found, and the virtual window can be moved to this target block to reduce shading problems and the purpose of manual operation by users.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. A virtual window configuration device, comprising:
    a processor, configured to generate a virtual window;
    a depth detection sensor, configured to generate depth information according to an image;
    a feature point detection sensor, configured to generate feature point information according to the image; and
    a storage device, wherein the processor is configured to access programs stored in the storage device to implement a depth analysis module and a feature point analysis module, wherein:
    the depth analysis module is configured to analyze the depth information to generate a depth matrix, and find a depth configuration block in the image according to the depth matrix;
    the feature point analysis module is configured to analyze the feature point information to generate a feature point matrix, and find a feature point configuration block in the image according to the feature point matrix;
    wherein the processor moves the virtual window to the depth configuration block, or moves the virtual window to the feature point configuration block;
    wherein a depth value of each pixel in the depth configuration block is greater than a depth threshold, and an area of the depth configuration block is greater than or equal to a predetermined block;
    wherein a number of feature points in the feature point configuration block is under a feature point threshold, and an area of the feature point configuration block is greater than or equal to the predetermined block.

2. The virtual window configuration device of claim 1, further comprising:
    a gravity sensor (G-Sensor), configured to detect a turning position of augmented reality glasses;
    a camera, configured to face the turning position to obtain the image;
    wherein the image includes an actual scene;
    wherein the processor moves the virtual window into a line-of-sight position;
    wherein the processor calculates the line-of-sight position at which the virtual window appears in the image according to the turning position.

3. The virtual window configuration device of claim 1, wherein the processor analyzes the depth configuration block and the feature point configuration block to find an overlapping block, and determines whether an area of the overlapping block is greater than or equal to the predetermined block;
    in response to the processor determining that the area of the overlapping block is greater than or equal to the predetermined block, the processor moves the virtual window to the overlapping block.

4. The virtual window configuration device of claim 3, wherein in response to the processor determining that the area of the overlapping block is not greater than or equal to the predetermined block, the processor moves the virtual window to the depth configuration block, or moves the virtual window to the feature point configuration block.

5. The virtual window configuration device of claim 1, wherein in response that the processor does not find that the depth configuration block in which the depth value of each pixel in the depth configuration block is greater than the depth threshold and the area of the depth configuration block is greater than or equal to the predetermined block; then the processor finds the feature point configuration block in which the number of feature points is under the feature point threshold, and the feature point configuration block has an area greater than or equal to the predetermined block;
    in response to the processor does not find the number of feature points under the feature point threshold, and the feature point configuration block with the area greater than or equal to the predetermined block, then the processor stays the virtual window in place.

6. The virtual window configuration device of claim 1, wherein the processor adjusts the virtual window to match a size of the feature point configuration block or the depth configuration block according to an original aspect ratio of the virtual window.

7. The virtual window configuration device of claim 1, wherein in response to the processor determining that the area of the overlapping block is greater than or equal to the predetermined block, the processor adjusts the virtual window to the size of the overlapping block according to an original aspect ratio of the virtual window, and moves the virtual window to the overlapping block.

8. A virtual window configuration method, comprising:
generating a virtual window using a processor;
generating depth information according to an image using a depth detection sensor; wherein the processor analyzes the depth information to generate a depth matrix, and finds a depth configuration block in the image according to the depth matrix;
generating feature point information according to the image by using a feature point detection sensor; the processor analyzes the feature point information to generate a feature point matrix, and finds a feature point configuration block in the image according to the feature point matrix; and
wherein the processor moves the virtual window to the depth configuration block, or the processor moves the virtual window to the feature point configuration block;
wherein a depth value of each pixel in the depth configuration block is greater than a depth threshold, and an area of the depth configuration block is greater than or equal to a predetermined block;
wherein a number of feature points in the feature point configuration block is under a feature point threshold and an area of the feature point configuration block is greater than or equal to the predetermined block.

9. The virtual window configuration method of claim 8, further comprising:
detecting the turning position of the augmented reality glasses using a gravity sensor (G-Sensor);
aiming a camera towards the turning position to obtain the image;
wherein the image includes an actual scene;
wherein the processor moves the virtual window into a line-of-sight position;
wherein the processor calculates the line-of-sight position at which the virtual window appears in the image according to the turning position.

10. The virtual window configuration method of claim 8, wherein the processor analyzes the depth configuration block and the feature point configuration block to find an overlapping block, and determines whether an area of the overlapping block is greater than or equal to the predetermined block;
in response to the processor determining that the area of the overlapping block is greater than or equal to the predetermined block, the processor moves the virtual window to the overlapping block.

11. The virtual window configuration method of claim 10, further comprising:
in response to the processor determining that the area of the overlapping block is not greater than or equal to the predetermined block, the processor moves the virtual window to the depth configuration block, or moves the virtual window to the feature point configuration block.

12. The virtual window configuration method of claim 10, wherein in response to the area of the overlapping block being greater than or equal to the predetermined block, the virtual window is adjusted to the size of the overlapping block according to an original aspect ratio of the virtual window, and the virtual window is moved to the overlapping block.

13. The virtual window configuration method 8, further comprising:
in response to not being able to find that the depth configuration block in which the depth value of each pixel in the depth configuration block is greater than the depth threshold and the area of the depth configuration block is greater than or equal to the predetermined block; then the processor finds the feature point configuration block in which the number of feature points is under a feature point threshold, and the feature point configuration block has an area greater than or equal to the predetermined block;
in response to not being able to find the number of feature points under the feature point threshold, and the feature point configuration block with the area greater than or equal to the predetermined block, then the processor stays the virtual window in place.

14. The virtual window configuration method of claim 8, further comprising:
adjusting the virtual window to match a size of the feature point configuration block or the depth configuration block according to an original aspect ratio of the virtual window.

15. A virtual window configuration system, comprising:
a processor, configured to generate a virtual window; and
augmented reality glasses, configured to receive the virtual window from the processor, comprising: a depth detection sensor, configured to generate depth information according to an image; and
a feature point detection sensor, configured to generate feature point information according to the image;
wherein the augmented reality glasses are configured to transmit the depth information and the feature point information to the processor;
wherein the processor is configured to analyze the depth information to generate a depth matrix, and to find a depth configuration block in the image according to the depth matrix;
wherein the processor is configured to analyze the feature point information to generate a feature point matrix, and to find a feature point configuration block in the image according to the feature point matrix;
wherein the augmented reality glasses are configured to move the virtual window to the depth configuration block transmitted by the processor, or to move the virtual window to the feature point configuration block transmitted by the processor;
wherein the depth value of each pixel in the depth configuration block is greater than the depth threshold, and an area of the depth configuration block is greater than or equal to a predetermined block, a number of feature points in the feature point configuration block is under the feature point threshold, and an area of the feature point configuration block is greater than or equal to the predetermined block.

16. The virtual window configuration system of claim 15, wherein the processor is configured to analyze the depth configuration block and the feature point configuration block to find an overlapping block, and to determine whether an area of the overlapping block is greater than or equal to the predetermined block;
in response to the processor determining that the area of the overlapping block is greater than or equal to an area of the predetermined block, the processor is configured to transmit coordinates of the overlapping block to the augmented reality glasses;
wherein another processor in the augmented reality glasses is configured to move the virtual window to the overlapping block according to the coordinates of the overlapping block.

* * * * *